United States Patent
Periyannan

(10) Patent No.: US 8,645,616 B2
(45) Date of Patent: Feb. 4, 2014

(54) PROTECTING GROUPS OF MEMORY CELLS IN A MEMORY DEVICE

(75) Inventor: Kirubakaran Periyannan, Santa Clara, CA (US)

(73) Assignee: Micron Technology, Inc., Boise, ID (US)

(*) Notice: Subject to any disclaimer, the term of this patent is extended or adjusted under 35 U.S.C. 154(b) by 543 days.

(21) Appl. No.: 13/020,517

(22) Filed: Feb. 3, 2011

(65) Prior Publication Data

US 2012/0203952 A1 Aug. 9, 2012

(51) Int. Cl.
*G06F 12/00* (2006.01)

(52) U.S. Cl.
USPC .................... 711/103; 711/163; 711/E12.008

(58) Field of Classification Search
None
See application file for complete search history.

(56) References Cited

U.S. PATENT DOCUMENTS

| | | | |
|---|---|---|---|
| 5,490,264 A * | 2/1996 | Wells et al. | 711/154 |
| 6,610,570 B2 | 8/2003 | Chen | |
| 7,509,525 B2 | 3/2009 | Kleiman et al. | |
| 7,764,546 B2 | 7/2010 | Torii | |
| 7,768,844 B2 | 8/2010 | Takase et al. | |
| 2010/0195363 A1* | 8/2010 | Norman | 365/51 |
| 2012/0198123 A1* | 8/2012 | Post | 711/103 |

* cited by examiner

Primary Examiner — Kevin Verbrugge
(74) Attorney, Agent, or Firm — Leffert Jay & Polglaze, P.A.

(57) ABSTRACT

Methods for memory block protection and memory devices are disclosed. One such method for memory block protection includes programming protection data to protection bytes diagonally across different word lines of a particular memory block (e.g., Boot ROM). The protection data can be retrieved by an erase verify operation that can be performed at power-up of the memory device.

27 Claims, 6 Drawing Sheets

FIG. 1

| | Byte 1 | Byte 2 | Byte 3 | Byte 4 | Byte 5 ... Byte 62 | Byte 63 | Byte 64 |
|---|---|---|---|---|---|---|---|
| Page 0 | 101 ↘ 00000000 | 11111111 | 11111111 | 11111111 | 11111111...11111111 | 11111111 | 11111111 |
| Page 2 | 11111111 | 103 ↘ 00000000 | 11111111 | 11111111 | 11111111...11111111 | 00000000 111 | 00000000 113 |
| Page 4 | 11111111 | 11111111 | 105 ↘ 00000000 | 11111111 | 11111111...11111111 | 11111111 | 00000000 115 |
| Page 6 | 11111111 | 11111111 | 11111111 | 107 ↘ 00000000 | 11111111...11111111 | 11111111 | 11111111 |
| ... | | | | | ... 109 | | |
| Page 62 | 11111111 | 11111111 | 11111111 | 11111111 | 11111111...00000000 | 11111111 | 11111111 |

FIG. 3

|  | Byte 1 | Byte 2 | Byte 3 | Byte 4 | Byte 5 ... Byte 62 | Byte 63 | Byte 64 |
|---|---|---|---|---|---|---|---|
| Page 0 | 00000000 | 11111111 | 11111111 | 11111111 | 11111111...11111111 | 00000000 | 11111111 |
| Page 2 | 11111111 | 00000000 | 11111111 | 11111111 | 11111111...11111111 | 11111111 | 00000000 |
| Page 4 | 11111111 | 11111111 | 00000000 | 11111111 | 11111111...11111111 | 11111111 | 11111111 |
| Page 6 | 11111111 | 11111111 | 11111111 | 00000000 | 11111111...11111111 | 11111111 | 11111111 |
| ... |  |  |  |  | ... |  |  |
| Page 62 | 11111111 | 11111111 | 11111111 | 11111111 | 11111111...00000000 | 11111111 | 11111111 |

SDC 00000000 00000000 00000000 00000000 00000000 11111111...00000000 00000000 00000000

PDC 00000000 00000000 00000000 00000000 00000000 11111111...00000000 00000000 00000000
  ↓         ↓         ↓         ↓         ↓         ↓          ↓         ↓
  310       311       312       313       300       314        315       316

PROTECTING GROUPS OF MEMORY CELLS IN A MEMORY DEVICE

TECHNICAL FIELD

The present invention relates generally to memory and a particular embodiment relates to memory block protection in a memory device.

BACKGROUND

Flash memory devices have developed into a popular source of non-volatile memory for a wide range of electronic applications. Flash memory devices typically use a one-transistor memory cell that allows for high memory densities, high reliability, and low power consumption. Common uses for flash memory include personal computers, personal digital assistants (PDAs), digital cameras, and cellular telephones. Program code and system data such as a basic input/output system (BIOS) are typically stored in flash memory devices for use in personal computer systems.

A flash memory is a type of memory that can be erased and reprogrammed in blocks instead of one byte at a time. A typical flash memory comprises a memory array, which includes a large number of memory cells. Changes in threshold voltage of the memory cells, through programming of charge storage structures (e.g., floating gates or charge traps) or other physical phenomena (e.g., phase change or polarization), determine the data value of each cell. The cells are usually grouped into memory blocks. Each of the cells within a memory block can be electrically programmed, such as by charging the charge storage structure. The data in a cell of this type is determined by the presence or absence of the charge in the charge storage structure. The charge can be removed from the charge storage structure by an erase operation.

There may be times when a manufacturer and/or user of a memory device might want to protect certain areas of memory by locking them so that they can be neither programmed nor erased. For example, manufacturers typically designate a certain memory block (e.g., block 0) of a non-volatile memory device as a Boot ROM area of memory in which the computer's basic input/output system (BIOS) is stored. This area of memory can then be protected from accidental erase and programming by setting the protection data.

Memory block protection is typically accomplished by programming all logical 0's to an entire page, of the designated Boot ROM portion, that is indicative of the memory block being protected. For example, if memory block 0 is to be protected from program/erase, the entire page 0 of the Boot ROM is programmed with logical 0's. If memory block 1 is to be protected, logical 0's are programmed to the entire page 1 of the Boot ROM.

Another way to program memory block protection is to program all logical 0's in one of four partial pages. For example, if memory block 0 is to be protected, all logical 0's are programmed into partial page 0 of page 0. If memory block 1 is to be protected, all logical 0's are programmed into partial page 1 of page 0.

The memory block protection data is read by a normal memory read operation at power-up of the memory device. Such a read operation only reads protection data for a limited number of blocks. For example, one page read operation reads protection data for four memory blocks. Thus, in order to read protection data for 16 memory blocks, four pages are read. If each page read operation is accomplished in a typical 125 ms, it might take 500 µs to read the four pages. If 32 or more memory blocks are protected, the read time to read the protection data at power-up could surpass a typical 1 ms limit to accomplish the power-up.

For the reasons stated above, and for other reasons stated below that will become apparent to those skilled in the art upon reading and understanding the present specification, there is a need in the art for a better way to store and detect protection data for particular memory blocks.

BRIEF DESCRIPTION OF THE DRAWINGS

FIG. 1 shows a diagram of one embodiment of diagonal programming of protection data.

FIG. 3 shows a diagram of one embodiment of a second step in reading the diagonally programmed protection data.

DETAILED DESCRIPTION

Figure 2:
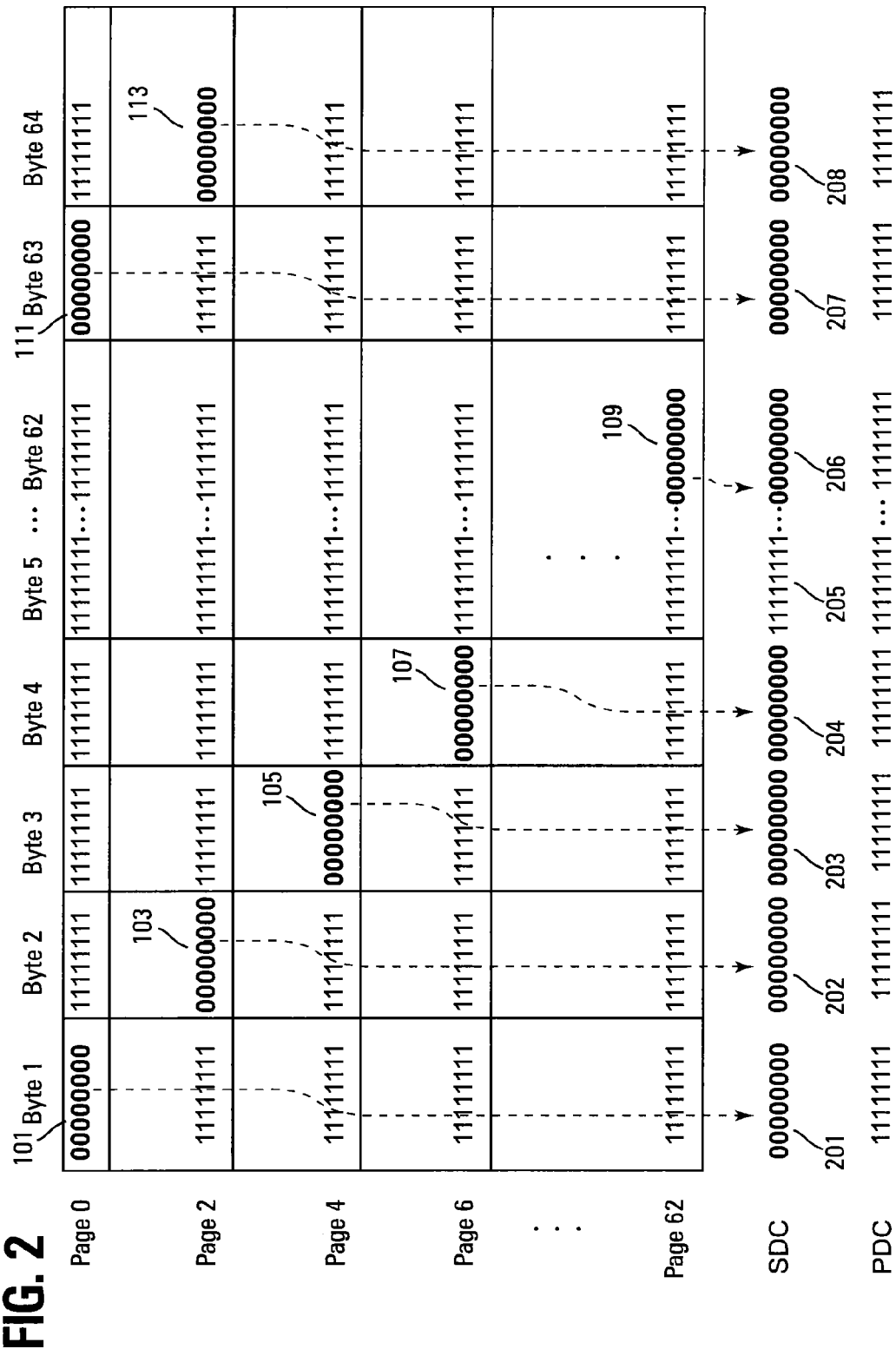
FIG. 2 shows a diagram of one embodiment of a first step in reading the diagonally programmed protection data.

In the following detailed description, reference is made to the accompanying drawings that form a part hereof and in which is shown, by way of illustration, specific embodiments. In the drawings, like numerals describe substantially similar components throughout the several views. Other embodiments may be utilized and structural, logical, and electrical changes may be made without departing from the scope of the present disclosure. The following detailed description is, therefore, not to be taken in a limiting sense.

FIG. 1 illustrates a diagram of one embodiment of diagonal programming of protection data. In the illustrated embodiment, the protection data is programmed to a particular group of memory cells such as a memory block (e.g., memory block 0). In one embodiment, this memory block can be referred to as a Boot ROM portion of the memory device. The embodiment illustrated in FIG. 1 also shows that the protection data is programmed diagonally to page segments (e.g., bytes) on even pages of a particular memory block. This leaves the odd pages to store other BIOS data. An alternate embodiment can program the protection data diagonally to bytes on odd pages of the particular memory block, thus leaving the even pages for the other BIOS data.

Since non-volatile memory cells are typically erased to logical 1's (e.g., erase data), the protection data is subsequently described as being logical 0's. In an alternate embodiment where the non-volatile memory cells are erased to logical 0's, the protection data can be logical 1's.

FIG. 1 shows protection data 101 programmed into the first byte of the first even page (e.g., page 0). This indicates that memory block 1 is protected from being erased or programmed. Protection data 103 programmed into the second byte of the second even page (e.g., page 2) indicates that memory block 2 is protected. Protection data 105 programmed into the third byte of the third even page (e.g., page 4) indicates that memory block 3 is protected. Protection data 107 programmed into the fourth byte of the fourth even page (e.g., page 6) indicates that memory block 4 is protected. This protection data programming pattern continues for all of the even pages down to the last page of the Boot ROM block (e.g., page 62) that has the protection data programmed into the $62^{nd}$ byte to indicate that block 62 is protected. It can be seen from FIG. 1 that the protection data 101, 103, 105, 107, and 109 are programmed into a first diagonal of protection data.

A second diagonal of protection data can be formed by programming protection data 111 at the $63^{rd}$ byte of the first even page (e.g., page 0) to indicate that memory block 63 is protected. Protection data 113 programmed into the $64^{th}$ byte of the second even page (e.g., page 2) indicates that memory block 64 is protected. Protection data 115 programmed into the $65^{th}$ byte of the third even page (e.g., page 4) indicates that memory block 65 is protected. This diagonal pattern continues to the final page (e.g., page 62) of the Boot ROM block.

For purposes of clarity, the diagram of FIG. 1 illustrates only two diagonals of protection data. These diagonal patterns can continue for the length of each page. For example, in one embodiment, 8 diagonals of protection data can be programmed into a memory block having 62 pages if each page can contain 8 bytes of protection data spaced 62 bytes apart.

FIG. 2 illustrates a diagram of one embodiment of a first step in reading the diagonally programmed protection data. The subsequent description of the embodiment of FIG. 2 assumes that the programming of the protection data as described in FIG. 1 has occurred. Alternate embodiments do not require that all of the protection bytes be programmed.

The reading of the protection data can be accomplished using an erase verify operation without judging whether the data has passed or failed. A typical prior art page read operation, that is used in detecting protection data of typical prior art memory devices, uses a greater amount of time to read the protection data than is used with an erase verify operation.

A typical method for performing an erase verify operation is to apply an erase verify voltage (e.g., 0V) as $V_{w1}$ to all of the memory cell control gates of a series string of memory cells. This is typically accomplished by substantially simultaneously biasing all of the access lines (e.g., word lines) of a series string. A $V_{th}$ of the series string is then measured and compared to a reference $V_{th}$.

The erase verity operation transfers each byte of data to, for example, a secondary data cache (SDC) that is coupled to the memory array. The illustrated embodiment shows that the protection data for the first diagonal of protection data is transferred to the first bytes (e.g., bytes 1-62). For example, protection data 101 for byte 1 is transferred to the first SDC byte 201. Protection data 103 for byte 2 is transferred to the second SDC byte 202. Protection data 105 for byte 3 is transferred to the third SDC byte 203. Protection data 107 for byte 4 is transferred to the fourth SDC byte 204. Byte 5 does not contain any protection data so the fifth SDC byte 205 is still logical 1's. Protection data 109 for byte 62 is transferred to the sixty second SDC byte 206.

If additional diagonals of protection data are programmed, as in the embodiment of FIG. 1, those diagonals of protection data are also transferred to the SDC. For example, protection data 111 for byte 63 is transferred to the sixty-third SDC byte 207. Protection data 113 for byte 64 is transferred to the sixty-fourth SDC byte 208.

At this point, the SDC has been programmed with all of the protection data that was previously programmed into the Boot ROM. The data from the SDC is then transferred to the associated bytes of the primary data cache (PDC), as shown in the second step of FIG. 3.

The data can be analyzed in the PDC to determine whether a particular memory block has been indicated as protected. In one embodiment, each byte of the PDC is individually analyzed to determine if a majority of bits (e.g., 5 bits) of each byte are logical 0's.

For example, referring to FIG. 3, the first four bytes 310-313 of the PDC each comprise all logical 0's. Thus, these bytes 310-313 indicate that memory blocks 1-4 are to be protected. Similarly, bytes 62-64 314-316 of the PDC each comprise all logical 0's. Thus, these bytes 314-316 indicate that memory blocks 62-64 are to be protected. However, byte 5 300 of the PDC comprises all logical 1's. Thus, memory block 5 is not protected.

Errors in memory cell programming may result in protection data including one or more logical 1's. Thus, determining if a majority of each individual byte comprises logical 0's reduces errors caused by improperly programmed memory cells.

Figure 4:
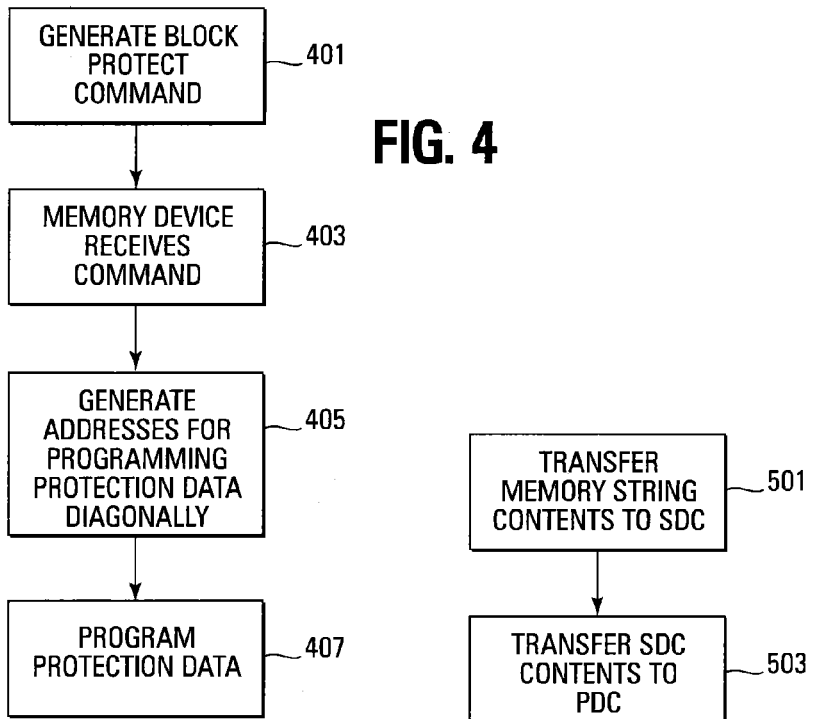
FIG. 4 shows a flowchart of one embodiment of a method for diagonal programming of protection data.

FIG. 4 illustrates a flowchart of one embodiment of a method for diagonal programming of protection data. A block protect command is generated 401. The command comprises an indication of the location of the memory block (e.g., memory block address) to be protected. The command can also include the protection data (e.g., logical 0's). The memory device receives the block protect command 403 and can generate a receipt confirmation.

The column and page addresses associated with page segment (e.g., byte) to be programmed diagonally with the protection data are generated 405 from the memory block location indication. If a memory block address is included in the command, the memory control circuitry can use the address to generate the column and page addresses for the particular byte to be programmed with the protection data. For example, a memory block 1 can be decoded into column address 0 and page address 0. Memory block 2 can be decoded into column address 1 and page address 2. Memory block 3 can be decoded into column address 2 and page address 4. Memory block 62 can be decoded into column address 61 and page address 63. Memory block 63 can be decoded into column address 62 and page address 0. The protection data is then programmed 407 to the byte at the generated column and page addresses.

Figure 5:
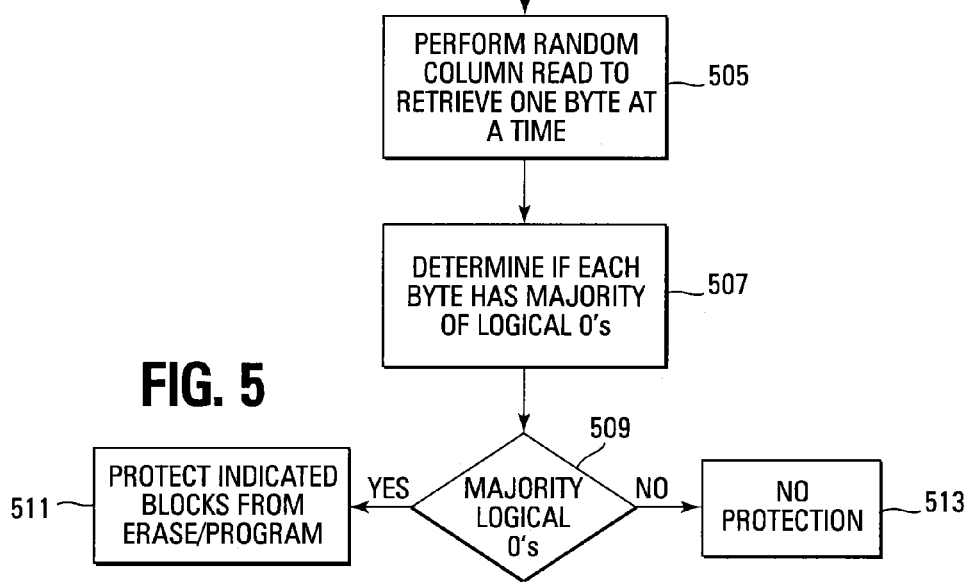
FIG. 5 shows a flowchart of one embodiment of a method for reading protection data.

FIG. 5 illustrates a flowchart of one embodiment of a method for reading protection data. As previously discussed, this read is an erase verify operation as opposed to a normal memory read operation. The memory string contents are transferred to the SDC 501. The SDC contents are then transferred to the PDC 503. Once in the PDC, a random column read of the PDC contents is performed on a byte-by-byte basis 505. As each byte of data is retrieved from the PDC, it is analyzed to determine if a majority of the bits are logical 0's 507 (assuming that the protection data is logical 0's). If the majority of bits are logical 0's 509, the indicated memory block is protected from both erase and programming 511. If the majority of bits are not logical 0's 509, the memory block is not protected and both erasing and programming of the memory block are allowed 513.

Figure 6:
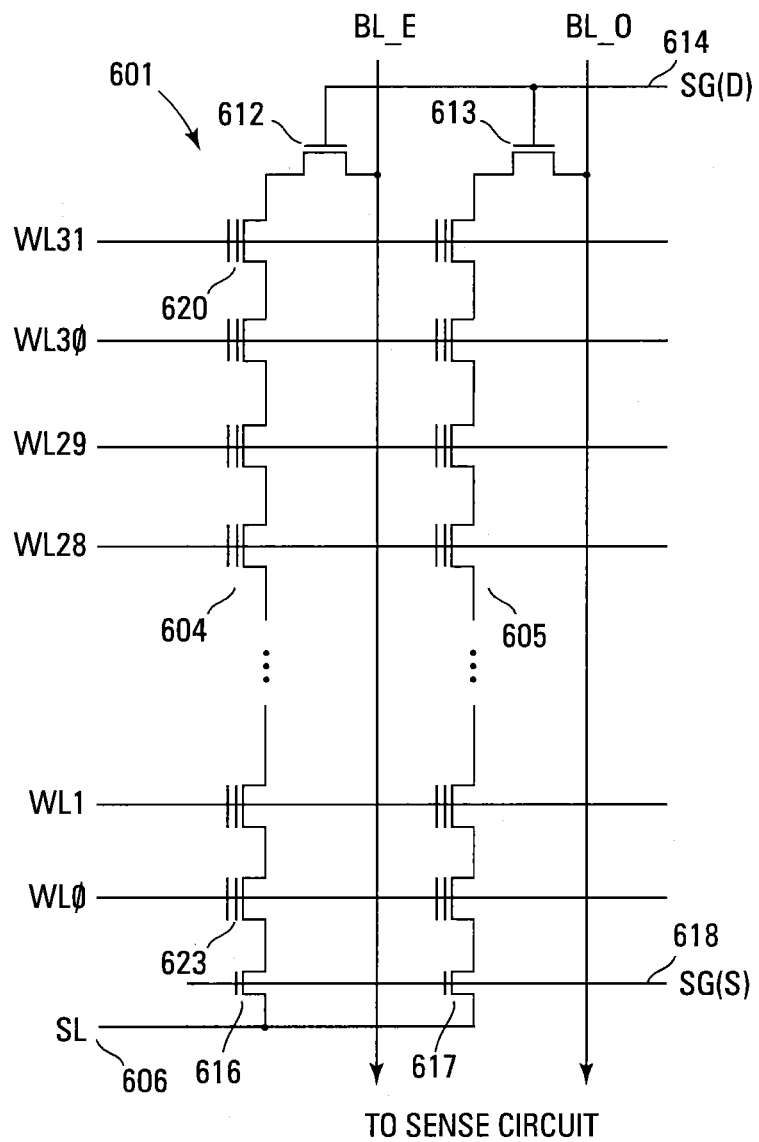
FIG. 6 shows schematic diagram of one embodiment of a portion of a memory array that can be programmed with protection data in accordance with the method of FIG. 3.

FIG. 6 illustrates a schematic diagram of one embodiment of a portion of a NAND architecture memory array 601, comprising series strings of non-volatile memory cells, that can store memory block protection data. The present embodiments of the memory array are not limited to the illustrated NAND architecture. Alternate embodiments can use NOR or other architectures as well.

The memory array 601 comprises an array of non-volatile memory cells (e.g., floating gate) arranged in columns such as series strings 604, 605. Each of the cells is coupled drain to source in each series string 604, 605. An access line (e.g. word line) WL0-WL31 that spans across multiple series strings 604, 605 is coupled to (and in some cases at least partially formed by) the control gates of each memory cell in a row in order to bias the control gates of the memory cells in the row. Data lines, such as even/odd bit lines BL_E, BL_O, are coupled to the series strings and eventually coupled to sense circuitry that detect the state of each cell by sensing current or voltage on a selected bit line.

Each series string 604, 605 of memory cells is coupled to a source line 606 by a source select gate 616, 617 (e.g., transistor) and to an individual bit line BL_E, BL_O by a drain select gate 612, 613 (e.g., transistor). The source select gates 616, 617 are controlled by a source select gate control line SG(S) 618 coupled to their control gates. The drain select gates 612, 613 are controlled by a drain select gate control line SG(D) 614.

Each memory cell can be programmed, for example, as a single bit cell (i.e., single level cell—SLC) or a multiple bit cell (i.e., multilevel cell—MLC). Each cell's threshold voltage ($V_t$) is representative of the data that is stored in the cell. For example, in a single bit cell, a $V_t$ of 1.5V can indicate a programmed cell while a $V_t$ of −0.5V might indicate an erased cell.

A multilevel cell has multiple $V_t$ ranges that each represents a different state. Multilevel cells can take advantage of the analog nature of a traditional flash cell by assigning a bit pattern to a specific $V_t$ range for the cell. This technology permits the storage of data values representing n bits (e.g., two or more bits) per cell, depending on the quantity of $V_t$ ranges assigned to the cell.

The memory cell array of FIG. 6 can be organized as memory blocks of memory cells and each memory block can be organized as pages of memory cells. A memory block might be 64 pages of single level cell data and 128 pages of multilevel cell data while each page might be comprised of 2048 bytes of data on 32 word lines.

Figure 7:
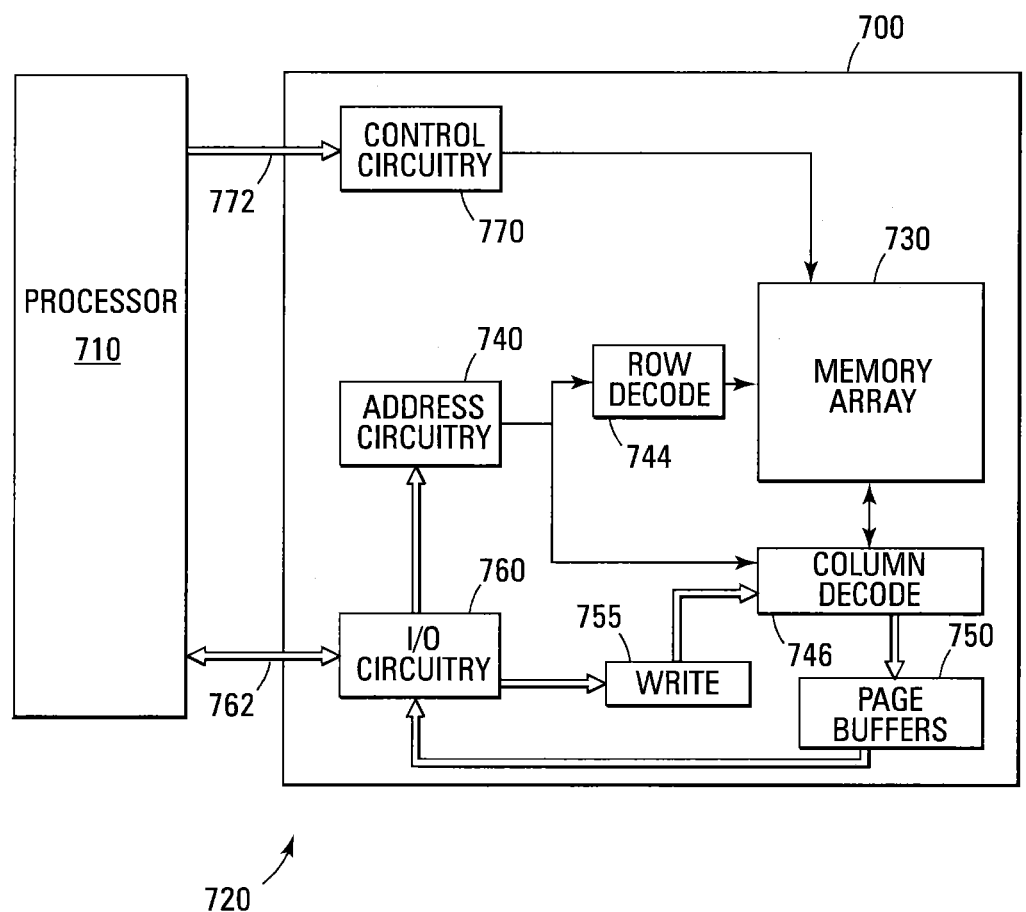
FIG. 7 shows a block diagram of one embodiment of a memory system that can incorporate the diagonal programming of protection data.

FIG. 7 illustrates a functional block diagram of a memory device 700. The memory device 700 is coupled to an external controller 710. The controller 710 may be a microprocessor or some other type of controlling circuitry. The memory device 700 and the controller 710 form part of a memory system 720. The memory device 700 has been simplified to focus on features of the memory that are helpful in understanding the present invention.

The memory device 700 includes an array 730 of non-volatile memory cells, such as the one illustrated previously in FIG. 6. The memory array 730 is arranged in banks of word line rows and bit line columns. In one embodiment, the columns of the memory array 730 are comprised of series strings of memory cells. As is well known in the art, the connections of the cells to the bit lines determines whether the array is a NAND architecture, an AND architecture, or a NOR architecture.

Address buffer circuitry 740 is provided to latch address signals provided through the I/O circuitry 760. Address signals are received and decoded by a row decoder 744 and a column decoder 746 to access the memory array 730. It will be appreciated by those skilled in the art, with the benefit of the present description, that the number of address input connections depends on the density and architecture of the memory array 730. That is, the number of addresses increases with both increased memory cell counts and increased bank and block counts.

The memory device 700 reads data in the memory array 730 by sensing voltage or current changes in the memory array columns using sense circuitry. The sense circuitry 750, in one embodiment, is coupled to read and latch a row of data from the memory array 730. Data input and output buffer circuitry 760 is included for bidirectional data communication as well as address communication over a plurality of data connections 762 with the controller 710. Write circuitry 755 is provided to write data to the memory array.

Memory control circuitry 770 decodes signals provided on control connections 772 from the external controller 710. These signals are used to control the operations on the memory array 730, including data read, data write (program), and erase operations. The memory control circuitry 770 may be a state machine, a sequencer, or some other type of control circuitry to generate the memory control signals. In one embodiment, the memory control circuitry 770 is configured to control generation of memory control signals that include execution of the embodiments of memory block protection of the present disclosure.

The flash memory device illustrated in FIG. 7 has been simplified to facilitate a basic understanding of the features of the memory. A more detailed understanding of internal circuitry and functions of flash memories are known to those skilled in the art.

Conclusion

In summary, one or more embodiments of the memory block protection can provide faster determinations of protected memory blocks on power-up of a memory device. This can be accomplished by using an erase verify operation, for example, to read all of the memory block protection data in one operation instead of an individual read operation for each memory block protection data. The erase verify operation can be used due to the programming of protection data as only page segments (e.g., bytes of data) that are less than a page and in a diagonal pattern through adjacent even or odd pages of data (e.g., adjacent word lines).

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention. It is intended that this invention be limited only by the following claims and equivalents thereof.

What is claimed is:

1. A method for protecting groups of memory cells, the method comprising:
   programming protection data into page segments of a particular group of memory cells wherein the protection data is programmed diagonally through the particular group of memory cells.

2. The method of claim 1 wherein the protection data comprises an opposite state from erase data.

3. The method of claim 1 wherein the protection data is programmed diagonally through either adjacent even pages or adjacent odd pages of the particular group of memory cells.

4. The method of claim 1 wherein the protection data comprises a byte of logical 0's.

5. The method of claim 1 wherein the protection data is programmed diagonally through adjacent access lines of the group of memory cells.

6. The method of claim 1 wherein the group of memory cells is a memory block.

7. The method of claim 1 wherein the group of memory cells is a Boot ROM portion of a memory device.

8. The method of claim 1 wherein the group of memory cells is memory block 0 of a plurality of memory blocks.

9. A method for protecting groups of memory cells, the method comprising:
programming protection data into page segments of a group of a plurality of pages wherein the protection data is programmed diagonally through either adjacent even pages or adjacent odd pages of the group of the plurality of pages; and
performing an erase verify operation on the group of the plurality of pages to read the protection data.

10. The method of claim 9 wherein performing the erase verify operation comprises performing the erase verify operation on the group of the plurality of pages at power-up of a memory device.

11. The method of claim 9 wherein the erase verify operation comprises:
transferring contents of the group of the plurality of pages to a first data cache;
transferring contents of the first data cache to a second data cache; and
performing a random column read on the second data cache to read each page segment.

12. The method of claim 11 and further comprising determining if each page segment comprises a majority of protection data.

13. The method of claim 12 and further comprising protecting a particular memory block from erase and programming when a page segment associated with the particular memory block comprises a majority of protection data.

14. The method of claim 9 wherein each page segment is associated with a different memory block.

15. A method for memory block protection, the method comprising:
receiving a protect command comprising an indication of a location of a particular memory block to be protected;
generating addresses responsive to the indication of the location of the particular memory block; and
programming protection data to a particular page segment associated with the addresses.

16. The method of claim 15 wherein the protect command further comprises protection data.

17. The method of claim 15 wherein the addresses comprise a column address and a page address for the page segment.

18. The method of claim 15 wherein the particular page segment is part of an even page and further comprising programming page segments associated with additional memory blocks to be protected such that the page segments associated with the additional memory blocks to be protected are programmed on even pages and wherein the page segments associated with the additional memory blocks are located diagonally from the particular page segment.

19. The method of claim 15 wherein the particular page segment is part of an odd page and further comprising programming additional page segments each associated with a different memory block to be protected such that each subsequently programmed page segment is programmed on an odd page and diagonally from the particular page segment.

20. The method of claim 15 wherein the particular page segment is programmed to a particular memory block comprising a particular number of pages and an additional page segment is programmed with protection data on the same page as the particular page segment and located the particular number of page segments from the particular page segment.

21. The method of claim 15 wherein the indication of the location of the particular memory block is a memory block address.

22. A memory device comprising:
an array of memory cells organized into memory blocks; and
control circuitry coupled to the array of memory cells and configured to control programming of the array of memory cells wherein the control circuitry is configured to program protection data into page segments of a particular memory block, wherein the control circuitry is further configured to program the protection data on page segments located diagonally through either adjacent even pages or adjacent odd pages of the particular memory block.

23. The memory device of claim 22 wherein the control circuitry is further configured to perform an erase verify operation on the particular memory block to read the protection data.

24. The memory device of claim 23 wherein the control circuitry being configured to perform an erase verify operation on the particular memory block to read the protection data comprises the control circuitry being further configured to transfer contents of the programmed page segments to a cache and control read operations of each segment of the cache.

25. The memory device of claim 24 wherein the control circuitry is further configured to determine if a first segment of the cache comprises a majority of protection data and further to protect a particular memory block of the array of memory cells, indicated by the first segment, from program and erase operations responsive to the first segment having a majority of protection data.

26. The memory device of claim 22 wherein the control circuitry is further configured to receive a protect command and generate an address for a page segment indicated by the command.

27. The memory device of claim 22 wherein the control circuitry is further configured to program a plurality of page segments with protection data in a same page of the particular memory block wherein each page segment programmed with protection data is separated from adjacent programmed page segments by a particular number of page segments that equal a particular number of pages in the particular memory block.

* * * * *